Nov. 24, 1970   J. P. CAIN ET AL   3,542,616
MOLDED ARTICLES OF WEARING APPAREL
Filed March 27, 1967   2 Sheets-Sheet 1
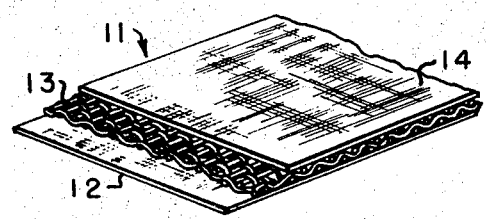
FIG.-1-
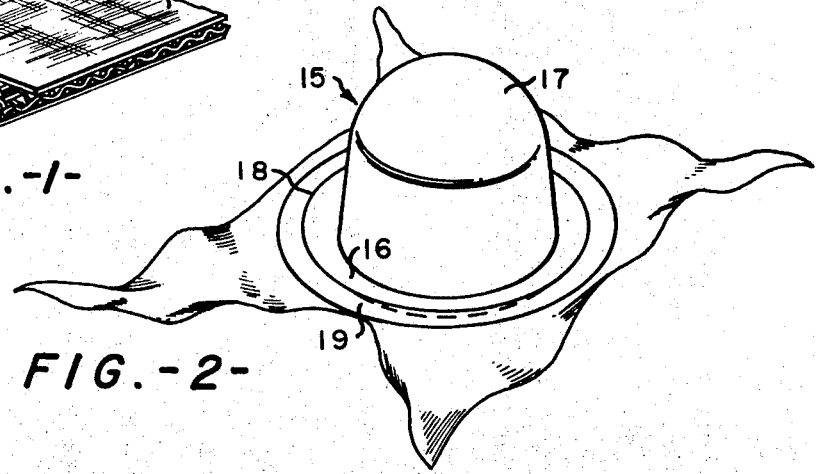
FIG.-2-
FIG.-4-
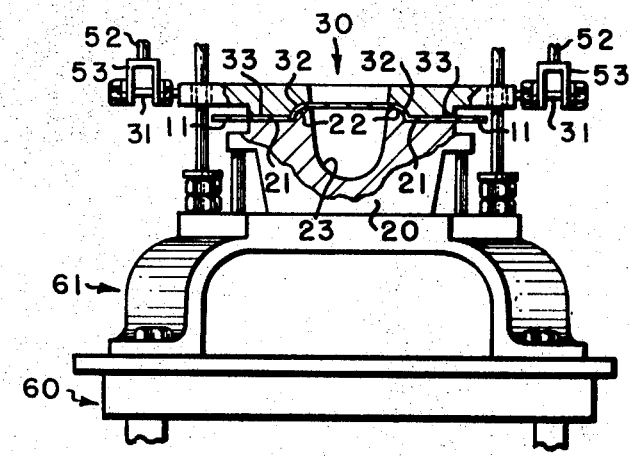
FIG.-5-
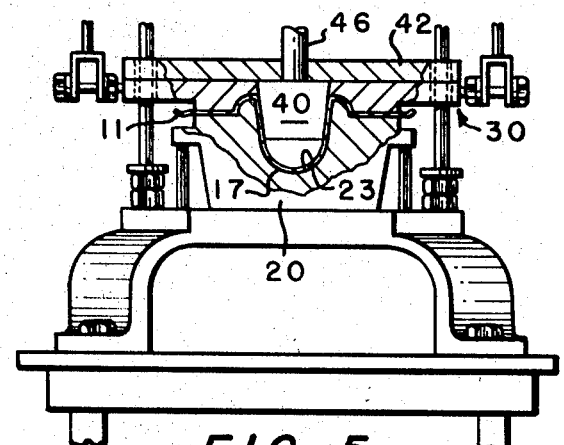
INVENTORS
JAMES P. CAIN
JOHN H. CROSS
BY
Armand P. Bisselle
ATTORNEY

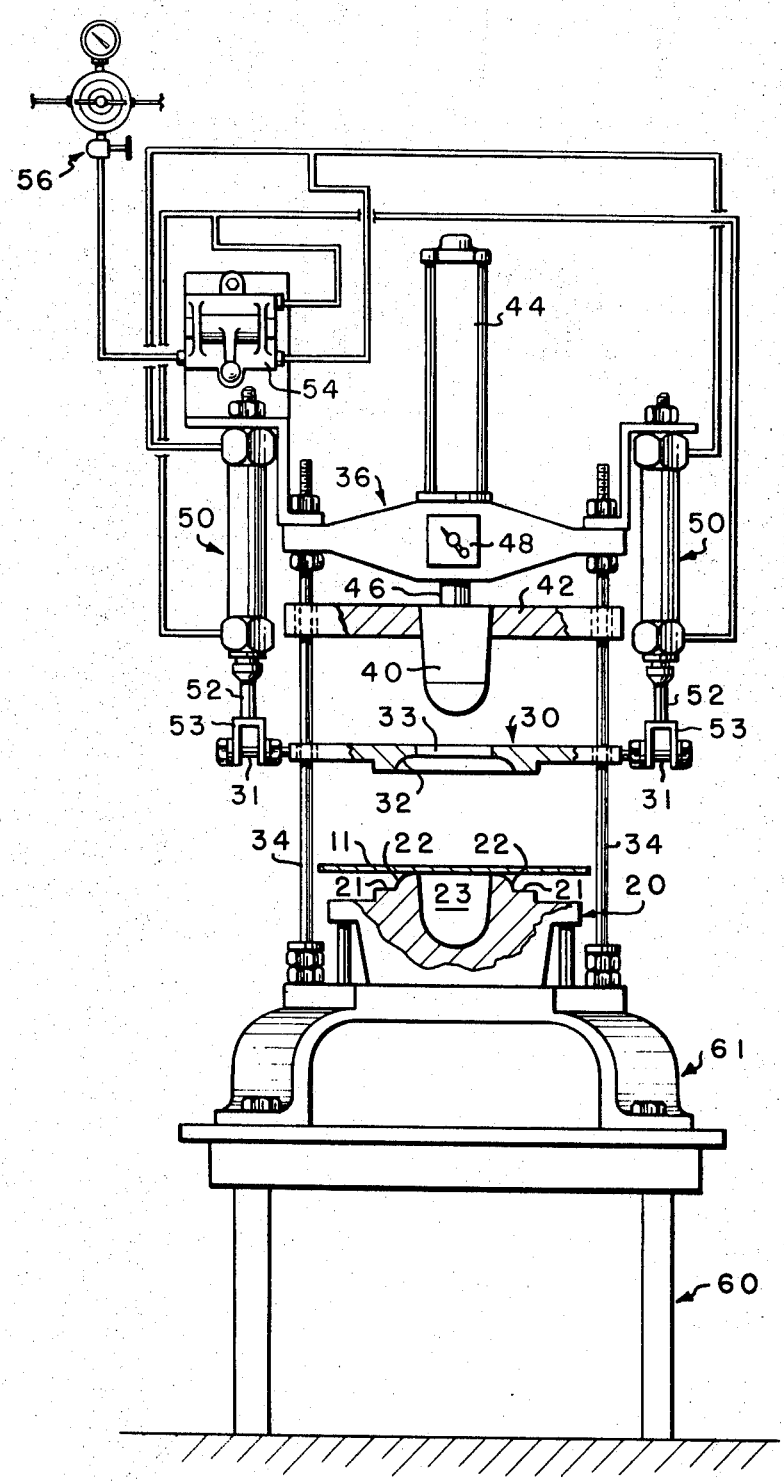
FIG.-3-

# United States Patent Office 3,542,616
Patented Nov. 24, 1970

3,542,616
MOLDED ARTICLES OF WEARING APPAREL
James P. Cain, Spartanburg, and John H. Cross, Anderson, S.C., assignors to Deering Milliken Research Corporation, Spartanburg, S.C., a corporation of Delaware
Filed Mar. 27, 1967, Ser. No. 627,251
Int. Cl. B29c 3/00
U.S. Cl. 156—224　　　　　　　　　　　　　　　　10 Claims

ABSTRACT OF THE DISCLOSURE

A molded article of wearing apparel having improved shape retention and recoverability properties prepared from a composite fabric which comprises at least one layer of a synthetic thermoplastic composition having a fixed structure such as a film or an open weave pattern, at least one layer of a textile fabric containing keratin fibers which have been contacted with a reducing agent and an aldehyde-generating compound prior to molding, and an adhesive composition between the thermoplastic and textile fabric layers to bond said layers together. These molded articles are prepared by placing the composite fabric in a mold for the article and thereafter applying heat and pressure to effect the desired shape.

BACKGROUND OF THE INVENTION

This invention relates to molded articles of wearing apparel and more particularly to a method of manufacturing molded hats having improved shape retention and recoverability properties.

The manufacture of wearing apparel and other textile articles by the molding or shaping of textile fabrics has been an attractive goal for many years. Most articles of this nature, for example, hats, brassiere cups, shoe uppers, rain coats, etc., have been prepared from a relatively large number of pieces of material which are cut to the desired shape and stitched together. For example, the crown of a hat can comprise from four to eight separate pieces cut in a particular shape and secured together. The brim of a hat is made of one or more additional strips of fabric cut to the shape and secured to the lower edge of the crown. These types of hats do not present the smart pleasing appearance of hats which are made of one piece. One reason, among others, for this lack of smart appearance is that these hats have a number of unsightly seams running up the crown. Furthermore, hats prepared in this manner do not usually possess the desired degree of shape retention and resilience, and must, therefore, be reblocked and reshaped periodically to restore the hats to their original shape. Needless to say, such operations are costly and time consuming. Attempts to improve the shape retention of such hats and other shaped articles by utilizing linings of rubber, paper and other materials which can impart a desired degree of stiffness to the article have been somewhat successful. Attempts have also been made to treat or spray the fabrics, generally after the article has been formed, with a liquid such as shellac or enamel to improve the shape retention properties of the articles. However, articles treated in this manner are necessarily very stiff and do not have the desirable amount of resiliency.

The use of thermoplastic fabrics for the manufacture of wearing apparel and other articles has been somewhat successful although such a method is not desirable where the finished article must be flexible and possess a smooth hand. The preparation of such articles from thermoplastic fabrics is generally accomplished by the application of heat to the thermoplastic material while permitting deformation or stretching into the desired shape. After formation is complete, the fabric is then set by an effective reduction of temperature. During the procedure, however, a greater degree of strain is exerted in certain fabric areas by the application of stress or tension sufficient to obtain the required displacement. For instance, in the manufacture of hats, there is a maximum amount of displacement found in the area of the crown of the hat as compared to the minimum fabric displacement required for the brim. The non-uniform application of stretching tension results in a finished product characterized by undesirable differences in fabric porosity and general appearance. Additionally, structural weaknesses within the shaped article are produced, and the desired flexibility is substantially diminished. Furthermore, molded articles of wearing apparel prepared exclusively from thermoplastic fabrics are generally stiff and inflexible as a result of the temperatures required during the shaping process.

Molded hats from flat-needle felted fabrics having an intermediate thermoplastic shrinkable member therein have been prepared by needling batting materials on each side of the intermediate layer and then shrinking and molding the felted fabric to form the molded hats. The procedure described in U.S. Pat. No. 3,156,926 involves preheating the needle-felted fabric, and while the thermoplastic layer is still warm and in a plastic state, molding the fabric in an unheated mold of the desired shape to cause the fabric to be stretched and molded to the desired shape.

Molded articles of wearing apparel also have been prepared from textile fabrics comprised of natural fibers in the form of discrete fiber assemblies, for example, woven or knitted woolen fabrics, by preparing a composition of the textile fabric and a layer of a fixed structure of a synthetic thermoplastic composition are described in copending application Ser. No. 624,510.

Although the molded articles of wearing apparel described in the copending application exhibit an unusual degree of shape retention and resiliency, there remains a need for a method of preparing molded articles of wearing apparel which possess additional stability and resistance to stress release and puckering.

SUMMARY OF THE INVENTION

These desirable properties are obtained by providing an improved process for preparing molded articles of wearing apparel having enhanced shape retention and recoverability properties comprising molding a composite fabric comprising:

(a) at least one layer of a fixed structure of a synthetic thermoplastic composition,
(b) at least one layer of a textile fabric containing keratin fibers, and
(c) an adhesive composition between the thermoplastic and textile fabric layers to bond said layers together.

The improvement comprising contacting the textile fabric with a reducing agent and an aldehyde-generating compound prior to molding.

BRIEF DESCRIPTION OF THE DRAWINGS

FIG. 1 is an illustrated view of the composite fabric.
FIG. 2 is a view of a molded hat body immediately after coming out of the mold.
FIG. 3 is a front view of a machine for molding hats, partially sectioned, with the composite fabric in place.
FIG. 4 is an enlarged transverse sectional view of the outer crown and brim mold and the annular brim die showing the composite fabric held in position between the outer crown and brim mold and the annular brim die.
FIG. 5 is a view similar to FIG. 4 with the inner crown die lowered into the cavity of the outer crown mold and the composite fabric between the inner crown die and the outer crown mold and between the inner brim die and the outer brim mold.

DESCRIPTION OF THE PREFERRED EMBODIMENTS

The fixed structure of a synthetic thermoplastic composition is preferably an open or loose mesh structure, for example, woven, knitted, or netted, although other forms having fixed structures are useful. Thus, the synthetic thermoplastic layer may be in the form of a sheet which can be smooth, embossed or foamed although the embossed sheets are preferred.

Polyesters, polyolefins and polyamides are examples of synthetic thermoplastic resins which are useful in the composite of this invention. The polyesters used in the preparation of the fixed structures are preferably those high molecular weight products obtained by reacting glycols, such as ethylene glycol, propylene glycol and the like, with polycarboxylic acids, or esters thereof such as, for example, terephthalic acid, isophthalic acid, adipic acid, succinic acid stilbenedicarboxylic acid and dimethyl terephthalate. A particularly useful polyester is obtained by condensing ethylene glycol and dimethyl terephthalate. The polyamides are preferably those high molecular weight products obtained by reacting polyamines and particularly the alpha,omega-diamines, such as 1,6-hexamethylene diamine, 1,5-pentamethylene diamine, etc., with polycarboxylic acids, such as adipic acid, succinic acid, phthalic acid and chlorophthalic acid. The polyamides also may be prepared by polymerization of aminocarboxylic acids such as aminocaproic acid. Examples of useful polyolefins include the high molecular weight polyethylenes, polypropylenes and mixtures thereof. Other synthetic thermoplastic compositions are useful in the preparation of the composite of this invention. It is essential, however, that the thermoplastic composition be capable of shrinking and stretching when heated. Additional examples of such thermoplastic compositions include cellulose ethers and esters such as cellulose acetate, cellulose propionate; polymers of acrylic acid, acrylonitrile, vinyl chloride and copolymers thereof. Polyurethanes obtained from polyfunctional isocyanates and polyhydroxy compounds can be used in preparing fixed structures such as sheets and foams. A particularly preferred fixed structure of a synthetic thermoplastic composition is a woven monofilament polyester scrim.

The thickness of the layer of fixed structure of a synthetic thermoplastic composition can vary from about 0.5 to about 200 mils. The thickness will vary depending upon the intended application, that is, the type of molded article of wearing apparel and the density of the fixed structure. Where, for example, an open weave structure is utilized in the composite fabric, it is possible for the structure to have considerable thickness without seriously detracting from the shape recoverability properties of the article. Where a light flexible article is desired, however, the layer of thermoplastic composition should be as light as possible without destroying the moldability and shape retention and recoverability properties of the resulting article. It is readily appreciated that the weight and thickness of the fixed structure of synthetic thermoplastic composition to be utilized in the preparation of the composite fabric of this invention can be easily determined by one skilled in the art, taking into consideration the type of molded article of wearing apparel being prepared.

In addition to the layer of fixed structure of a thermoplastic composition, the composite fabrics of this invention contain at least one layer of a textile fabric containing keratin fibers. While the process of this invention is particularly adapted to fabrics composed essentially of keratin fibers, especially those composed entirely of wool fibers, it is applicable also to fabrics wherein synthetic, natural, or other keratin fibers are blended with the wool component. Other keratin fibers include mohair, alpaca, cashmere, vicuna, guanaco, camels hair, llama and the like. Other natural fibers which may be blended with the keratin fibers include cotton and silk. Preferred synthetic fibers for blending with these fibers include polyamides such as polyhexamethylene adipamide; polyesters such as polyethylene terephthalate; and acrylic fibers such as acrylonitrile; homopolymers or copolymers containing at least about 85% combined acrylonitrile, such as acrylonitrile/methyl acrylate (85/15); and cellulosics, such as cellulose acetate and viscose rayon.

The textile fabrics which may be used in the process of this invention include those obtained from discrete fiber assemblies such as yarns by weaving, knitting, braiding, or plaiting, as well as felts or layers of fibers in batt form.

The adhesive which is used to bond the textile fabric to the thermoplastic composition is preferably a curable polymeric composition which is non-tacky after curing. Elastomers which are soluble or dispersible in a liquid carrier are particularly useful as adhesives, and these include, for example, those elastomers prepared from acrylates, natural rubber, styrene-butadiene, butadiene acrylonitrile, butyl rubber, ethylene propylene rubber, chlorosulfonated polyethylene, polyesters, fluorocarbon rubbers, chloroprene rubber and urethane elastomers prepared from either polyethers, or polyesters. Optimum resilience is achieved when the adhesive used is natural rubber or a synthetic rubber such as the chloroprene rubbers. Where it is desired to produce a molded article which is particularly resistant to chlorinated solvents and aging, cross-linked neoprene rubbers are used.

The textile fabric layers may be bonded to the thermoplastic composition by applying the adhesive to either the fabric or the thermoplastic composition and thereafter pressing the two layers together. The adhesive can be applied to the substrates as a continuous or discontinuous layer although the application of a discontinuous layer of adhesive to the thermoplastic composition is preferred. The adhesive may be applied by conventional techniques such as by knife-coating, rolling, printing, dipping and spraying, but it is most advantageously applied to the thermoplastic composition with ordinary pad rolls. Where an open weave thermoplastic composition is used, it is desirable to apply the adhesive in such a manner that there is no "window paning" (filled interstices) yet enough adhesive to provide a satisfactory bond. The window paning problems can be reduced by properly adjusting the viscosity of the adhesive and the pressure on the rolls. Window paning can also be reduced by wrapping the pad rolls with wool felt and then padding on the adhesive. The exact conditions for using a particular adhesive with a particular thermoplastic composition can be readily determined by those practicing the invention.

An especially preferred method of preparing the fabric composite containing two layers of textile fabric involves a continuous process wherein the thermoplastic composition passes over rollers through an adhesive composition and then between two pad rolls which control the amount of adhesive remaining on the thermoplastic composition. From this pair of pad rolls, the thermoplastic composition continues to another pair of rolls. Just prior to entering the nip of these rolls, the layers of textile fabric are joined to the thermoplastic composition and pass through the nip of the rolls. The pressure exerted by the rolls produces a three layer loosely bonded composite which then passes into a dryer operated at a low temperature. While passing through the dryer, the adhesive material dries and the liquid carrier is driven off resulting in a permanent bond between the textile fabric and the thermoplastic composition.

The amount of adhesive which is applied to the thermoplastic composition is not critical, the only requirement being that enough adhesive is applied to the thermoplastic composition to provide a satisfactory bond between the thermoplastic composition layer and the textile fabric layer. Generally, from about 2.5 to about 25% by weight of adhesive based on the weight of the fabric layer is used to bond each layer of fabric to the thermoplastic layer. Thus, where one layer of fabric is to be bonded to each side of the thermoplastic layer, from about 5% to about 50% by weight of adhesive based on the weight of the textile fabric will generally be applied to the thermoplastic layer.

The composite fabric of this invention comprises at least one layer of a fixed structure of a synthetic thermoplastic composition and at least one layer of a textile fabric, said layers being bonded together with an adhesive composition. The basic construction of the composite is one layer of the thermoplastic composition and one layer of a textile fabric bonded together with an adhesive. A preferred embodiment is a composite fabric comprised of two layers of the textile fabric and an intermediate layer of the synthetic thermoplastic composition (FIG. 1), the two layers of textile fabric (12 and 14) being bonded with an adhesive to the thermoplastic layer (13). This preferred embodiment allows the preparation of one piece molded articles which can be molded in one operation eliminating the need for a subsequent application of a lining. The two layers of textile fabric need not be identical. That is, where only one layer may be exposed or visible, the second layer, generally an inner layer in the final article of wearing apparel may be comprised of less expensive fibers or fibers which have particular aesthetic properties such as pleasing hand. Thus, the inner layer may be, for example, an inexpensive cotton fabric or a smooth fabric such as silk.

On the other hand, where both layers of textile fabric will be visible, it is often desirable that both layers be comprised of the same textile fabric. For example, in molded hats consisting of a one piece crown and brim, both sides of the brim (top and bottom) should be comprised of the same textile fabric. This objective can be obtained easily by preparing the molded hat from a composite fabric combining two identical fabric layers.

In applications where the molded article of wearing apparel is characterized by greater stiffness, it may be desirable to use a plurality of layers of thermoplastic compositions and textile fabrics. For example, two layers of the thermoplastic composition may be bonded together to increase the thickness and stiffness of the layer and the shape retention properties of the article prepared from the composite. Also, it is possible to prepare composites of several layers by alternating the thermoplastic and textile fabric layers and bonding the adjacent layers to one another with the adhesive compositions described above. The exact nature of the composites of this invention will be determined by the anticipated end use and the generally accepted properties of such end uses.

As mentioned previously the shape retention and recoverability properties of the molded article can be enhanced by contacting the textile fabric with a reducing agent and an aldehyde-generating compound prior to molding. Such a treatment results also in a molded article having improved shape definition and increased ability to resist stress release or puckering. The reducing agent and aldehyde-generating compound can be applied to the fabric prior to the formation of the composite, or it can be applied to the fabric after the composite has been formed.

Typical aldehyde-generating compounds include linear polymers, particularly those of the general formula $HO(CH_2O)_n$—H which depolymerize to monomeric formaldehyde gas upon vaporization. In this class of compounds, there are included lower polyoxymethylene glycols, wherein $n$ is from about 2 to about 8; paraformaldehyde, wherein $n$ ranges from about 6 to about 100; alpha-polyoxymethylenes, wherein $n$ is greater than about 100; betapolyoxymethylene wherein $n$ is greater than about 100, and the like.

Polyoxymethylene glycol derivatives may also be utilized, e.g., such as the polyoxymethylene diacetates, the lower polyoxymethylene dimethyl ethers, gamma-polyoxymethylenes (higher polyoxymethylene dimethyl ethers), delta-polyoxymethylenes, epsilon-polyoxymethylenes and the like. In general, higher temperatures, e.g., up to about 200° C. are utilized to effect depolymerization of these derivatives.

Formaldehyde acetate (formals) may also be utilized. Preferred formals are produced by reaction of formaldehyde with alcohols of the formula $CH_2(OR)_2$ in the presence of an acid catalyst, wherein R is alkyl or aralkyl. These compounds hydrolyze to formaldehyde and the parent alcohol. Preferred formals include methylal and 1,3-dioxolane. The latter compound hydrolyzes to formaldehyde and ethylene glycol and is particularly preferred among this class of compounds when used in presensitizing processes.

Additional suitable generating compounds include the various methylol compounds, for example, methylolalkanolamine sulfites, such as N-methylolethanolamine sulfite, N,N-dimethylolethanolamine sulfite, N,N-dimethylolisopropanolamine sulfite and the like; methylol amides, such as N-methylol formamide, N-methylol acetamide, N-methylol acrylamide and the like; amines, such as hexamethylene tetramine, trimethylolmelamine and the like; and compounds such as the alkali-metal formaldehyde bisulfites, including sodium and potassium formaldehyde bisulfites.

The reducing agents which are useful in the process of this invention include the metallic formaldehyde sulfoxylates, such as zinc formaldehyde sulfoxylate; alkali metal sulfoxylates, such as sodium formaldehyde sulfoxylate; alkali metal borohydrides, such as sodium borohydride and potassium borohydride; alkali metal sulfites, such as sodium or potassium bisulfite, sulfite, metabisulfite, or hydrosulfite; mercaptan acids, such as thioglycollic acid and its water-soluble salts, such as sodium potassium or ammonium thioglycollate; mercaptans, such as hydrogen sulfide and sodium or potassium hydrosulfide; alkyl mercaptans, such as butyl or ethyl mercaptans and mercaptan glycols, such as beta-mercaptoethanol; ammonium bisulfite, sodium sulfide, sodium hydrosulfide, cysteine hydrochloride, sodium hypophosphite, sodium thiosulfate, sodium dithionate, titanous chloride, sulfurous acid and the like and mixtures of these reducing agents.

The reducing agent and aldehyde-generating compounds may be applied to the textile fabric in their pure state, as dry materials, emulsions, dispersions or solutions although aqueous solutions of the reducing agent and aldehyde-generating compound are preferred. The aqueous solution can be applied to the textile fabric by any of the well known methods such as padding, dipping, rolling, spraying, etc., squeezed or extracted, and dried at temperatures up to 100° C. The solutions can be applied to the textile fabric prior to formation of the composite fabric, and this method is preferred, although acceptable results are obtained when the composite fabric is prepared and then contacted with the solution of reducing agent and aldehyde-generating compound.

The amount of reducing agent applied to the textile fabric can be within the range from about 0.1 to about 30% or more based on the weight of the fabric although an upper limit of 10% appears to be satisfactory in most applications. (All percentages in this specification, unless otherwise specified will be weight percentages based on the weight of the fabric being treated.) The amount of aldehyde-generating compound applied to the fabric should be in excess of that required to react with or neutralize the reducing agent and reduced keratin fibers. Generally, from about 1 to about 20 mole percent of the aldehyde-generating compound, based on the moles of reducing agent utilized in the treatment of keratin fibers, are desirable although a large excess should be avoided less the desirable properties of the molded article be affected.

In addition to the reducing agent and the aldehyde-generating compound, the mixture, dispersion, solution, etc. may contain other additives which impart certain desirable properties to the textile fabric and the ultimate molded article. For example, aromatic aldehydes may be included to overcome possible odor problems associated with the use of reducing agents or keratin fibers. Examples of such aldehydes include benzaldehyde, phenylacetaldehyde, para-isopropyl benzaldehyde, ortho-nitrobenzaldehyde, and alpha-naphthaldehyde, and ortho-chlorobenzaldehyde.

The incorporation of low molecular weight polyhydroxy compounds or swelling agents is often desirable. By the term "low molecular weight polyhydroxy compound" is meant a compound containing more than one hydroxy group and preferably having a molecular weight of less than about 4000. Such compounds include ethylene glycol, trimethylene glycol, 1,2-propylene glycol, diethylene glycol, polyethylene glycol, glycerine and trimethylol butane. Urea constitutes the most readily available swelling agent although other materials which swell wool fibers in an aqueous medium are suitable. For example, formamide, N,N-dimethylformamide, acetamide, thiourea, phenol and lithium salts such as chloride, bromide and iodide are useful.

The swelling agent or low molecular weight polyhydroxy compound may be utilized in any desired amount depending on the requirements for the particular textile fabric. For example, as little as about 0.5 to 1% provides some improvement, although larger amounts, e.g., from about 3 to about 10% provide noticeable improvements.

The properties of the article of wearing apparel can often be improved by treating the textile fabric used in the preparation of the composite with a resin which will effect the desired results such as improved hand and body to the fabric. The resin can be applied to the fabric prior to formation of the composite, or it may be applied to the fabric after the composite has been formed. Examples of resins which are useful for the above purposes include the polymers and copolymers of vinyl chloride, vinyl acetate, methylmethacrylate, vinyl butyrate and the urethanes. Polyvinyl chloride and polyvinyl acetate are particularly preferred for improved water and solvent resistance.

The composites of this invention may be rendered water repellent by application of any of the well known water-repellency treatments such as wax emulsions, silicones, organo-chromium compounds and the fluorochemicals. The fluorochemicals are a particularly useful class of water-repellents since these also offer some measure of oil-repellency to treated fabrics. The fluorochemicals used for water-repellency include compounds based on chromium complexes of perfluorocarboxylic acids, chromium complexes of perfluoroalkylmonocarboxylic acids and fluorinated acrylic and methacrylic esters.

While fluorochemicals can be used alone to confer water-and-oil repellency to the fabrics, the results obtained can be considerably improved by the addition of other conventional water-repellents to the finishing bath. For example, Minnesota Mining and Manufacturing Company's "Scotchgard" process is based on a mixture containing about 0.6% of fluorochemical solids, 1 to 2% of a conventional durable water-repellent and from about 1 to about 1.5% of an aminoplast, e.g., melamine formaldehyde. The water-repellent mixtures are applied to the fabric by any of the well known methods such as padding, dipping, rolling, etc., squeezed, dried and baked at temperatures up to 200° C. As with other fabric treatments which are used in the composite of this invention, the water-repellent mixture may be applied to the fabric either before or after the composite has been prepared, although it is preferred to apply the solutions to the fabric prior to the formation of the composite. This is especially true where the water-repellent treated wet fabric must be dried and baked at temperatures which are high enough to affect the thermoplastic layer of the composite. Although any or all of these additives may be applied to the textile fabrics separately, prior to or after formation of the composite fabric, the preparation and application of one solution, dispersion, etc. containing all of the desired additives to the textile fabrics prior to formation and cutting of the composite fabric is preferred. The solution, dispersion etc., as mentioned previously, can be applied by any of the well known methods to a pickup of from 10% to about 100 or 150% by weight of the fabric, and the volatile materials such as solvents or the dispersing media are removed by drying to temperatures of about 100 to 125° C.

The following examples illustrate the solutions, dispersions, etc., useful in the process of the invention:

Example A

| | Percent by weight |
|---|---|
| Sodium bisulfite | 4.3 |
| N-methylol acetamide | 10 |
| Benzaldehyde | 0.5 |
| Polyvinyl chloride emulsion (60% active ingredients available under the tradename "Geon 576" from the B. F. Goodrich Co.) | 20 |
| Fluorochemical water repellent ("FC–208") | 2 |
| Water | 63.2 |

Example B

| | |
|---|---|
| Sodium bisulfite | 4.3 |
| Ethylene glycol | 14.3 |
| Diammonium phosphate | 1.0 |
| N-methylol acetamide | 10.0 |
| "FC–208" | 1.5 |
| Water | 68.9 |

Example C

| | |
|---|---|
| Sodium bisulfite | 4.3 |
| Ethylene glycol | 14.3 |
| Diammonium phosphate | 1.0 |
| N-methylol acetamide | 10.0 |
| "FC–208" | 2.0 |
| Water | 68.4 |

Example D

| | |
|---|---|
| Sodium bisulfite | 4.3 |
| Ethylene glycol | 14.3 |
| Diammonium phosphate | 1.0 |
| N-methylol acetamide | 10.0 |
| "FC–208" | 2.5 |
| Water | 67.9 |

Example E

| | |
|---|---|
| Monoethanolamine sulfite | 10 |
| Ethylene glycol | 5.0 |
| Paraformaldehyde | 3.5 |
| Water | 81.5 |

Example F

| | |
|---|---|
| Sodium bisulfite | 35.2 |
| N-methylol acetamide | 64.8 |

Example G

| | |
|---|---|
| Ethanolamine sulfite | 7.5 |
| N-methylol formamide | 9.0 |
| 3-(perfluorooctyl)-propanol (as described in U.S. Pat. No. 3,171,861) | 1.5 |
| Water | 83.0 |

Example H

| | |
|---|---|
| Sodium bisulfite | 5.2 |
| N-methylol acetamide | 10.0 |
| Polyvinyl acetate ("Resin 1014" obtained from National Starch Co.) | 15.0 |
| Water | 69.8 |

The shaping of the article of wearing apparel is effected under such conditions of temperature and pressure that the thermoplastic composition is softened but not fused. The temperature of the treatment will vary with the nature of the particular synthetic thermoplastic composition and the textile fabric utilized in the composite fabric. In some instances, it is possible to effect the shaping at higher temperatures without fusing if the period of heating is reduced. That is, it is possible to reduce the time of heating if the composite is subjected to higher temperatures. However, the shaped articles may be too stiff and firm if high temperatures for longer periods are utilized. Generally, temperatures in the range of from about 100° to about 200° C. for periods of from 5 seconds to about 3 minutes have been found to be satisfactory. The optimum conditions of temperature and time for a particular composite fabric can be readily determined by one skilled in the art.

In carrying out the shaping operation, any suitable device or expedient may be employed. For instance, the flat composite fabric may be placed between the male and female members of a mold-like device of desired shape, either or both of which may be heated internally or externally by ordinary steam, super heated steam, steam under pressure, electrical resistance, flames and the like. Such devices may be provided with means, such as perforations or jets to supply steam to the textile fabric in order to facilitate the shaping of the composite.

While the shaping operation may be carried out in any suitable device, a preferred apparatus for preparing hats is shown in FIGS. 3 and 5 wherein a frame 60 is provided with a base 61 on which is mounted an outer crown and brim mold 20 having an outer upper annular flat surface 21, an intermediate curved upper annular brim surface 22 and a crown cavity 23. Extending above the base is a pair of posts 34 having their upper ends joined together by a cross bar 36. Slidably mounted on these posts is an annular inner brim die 30 with extension rods 31, said brim die 30 having a curved inner lower annular surface 32 and the open center 33. The inner brim die 30 is mounted above the outer crown and brim mold 20 and aligned so that when lowered down to and against the composite fabric 11, the curved inner lower annular surface 32 of inner brim die 30 will be aligned with the intermediate curved upper annular surface 22 of the outer crown and brim mold 20 as shown in FIG. 4.

An inner crown die 40 is attached to support bar 42 which is slidably mounted to the posts 34 above the annular inner brim die 30 and adapted to be moved downwardly through the open center 33 of the brim die 30 contacting the fabric 11 moving a portion of said fabric 11 downwardly and against the sides of the cavity 23 of the outer crown and brim mold 20 as shown in FIG. 5.

While manual or mechanical means for moving the annular inner brim die 30 and inner crown die 40 downwardly into the positions shown in FIGS. 4 and 5 may be employed, they are illustrated in FIG. 3 as an air pressure actuated means (partially shown). Two cylinders 50 are mounted to the ends of the posts 34 above the cross bar 36, said cylinders having piston rods 52 connected to the annular brim die 30 through U-brackets 53 and extension rods 31. These cylinders 50 and piston rods 52 are actuated by air pressure controlled by a manually operated valve 54, the amount of pressure being controlled by adjustable pressure valve 56. In the embodiment illustrated in FIG. 3, the downward motion of the inner crown die 40 and its support 42 which is slidably mounted to posts 34 is controlled by cylinder 44 which is mounted above the cross bar 36 and connected to support 42 by way of piston rod 46. Said cylinder 44 and piston rod 46 are actuated by air pressure (not shown), and the amount of pressure exerted by inner crown die 40 and support 42 when in the lowered position illustrated in FIG. 5 is controlled by an adjustable pressure valve (not shown). The adjustable timing means 48 controls the length of time the inner crown die 40 and support 42 remains in the lowered position illustrated in FIG. 5, and automatically releases the air pressure thereby raising support 42 and inner crown die 40 at the end of the selected time.

Since heat as well as pressure is necessary to effect the desired degree of permanency to the shaped bodies, and particularly the hats prepared in the apparatus described above, heating means (not shown) are provided for heating support 42, the inner crown die 40 and the outer crown and brim mold 20. Although annular inner brim die 30 may be heated directly, the temperature of the die is raised sufficiently as a result of its contact with support 42. Generally, the die 30 is maintained in contact with heated support 42 when the apparatus is not being used.

In the normal operation of the apparatus illustrated in FIGS. 3 to 5, a piece of the composite fabric 11 approximately 20 inches square is placed above the outer crown and brim mold 20. The outer crown and brim mold 20 and inner crown die 40 and support 42 can be heated to a temperature of from 100° C. to about 200° C., the exact temperature being determined after considering the nature and properties of the components of fabric 11. The annular upper brim die 30 is lowered into the position shown in FIG. 4 by opening valve 54 which activates cylinders 50 and piston rods 52. The downward pressure exerted by brim die 30 on the composite fabric which is now in place between the brim die 30 and crown and brim mold 20 is generally within the range of from about 1 to 100 p.s.i. The ideal pressure will vary depending on the fabric construction since the pressure exerted serves to control the rate and manner in which the fabric 11 is forced into the cavity 23 of outer crown brim mold 20. The use of an annular brim die with the smooth lower outer flat surface 33 which is aligned directly above the outer upper annular flat surface 21 of outer crown and brim mold 20 is preferred over other methods for applying restraining pressures to the outer edges of fabric 11 since this method results in a more uniform restraining pressure on the fabric. Other methods of restraining the fabric such as by manual restraint or other known mechanical means such as blade-type retainers or mechanically operated fingers may be utilized but are not as efficient. Uneven restraining pressure can result in stretching and thinning out of the fabric, and the formation of wrinkles which are permanently molded into the hat.

After the brim die 30 is in position as shown in FIG. 4 and the desired pressure is applied, the heated inner crown die 40 and support 42 are lowered into the position shown in FIG. 5 by setting the adjustable timing means 48 which also controls the length of time the inner crown die 40 will remain within the cavity 23. The speed at which support 42 is lowered is controlled so that the heated inner crown die will engage and progressively force the fabric 11 into and against the sides of heated cavity 23 to form a crown 17 of the hat body 15 as shown in FIG. 5. As the inner crown die completes its downward motion, the support 42 increases the downward pressure exerted by the inner brim die 30 and the pressure exerted on fabric 11 between elements 32 and 22 forming the brim 16 of the hat. The downward pressure exerted on the fabric by the inner crown die 40 and support 42 is generally between 20 to 100 p.s.i., and preferably between 30 to 70 p.s.i. Generally, the apparatus is maintained in the position illustrated in FIG. 5 for a period of from about 15 seconds to 5 minutes and preferably from about 30 seconds to 3 minutes to complete the molding of the hat body 15. The preferred times will depend upon the pressure exerted, the temperature of the mold and die and the nature of the composite fabric, especially the nature of the thermoplastic component. If the composite fabric 11 is heated for too long a period of time, the thermoplastic component and the textile fabric may be seriously affected resulting in the formation of hats which are discolored and/or stiff.

After the fabric has been subjected to the desired temperature and pressure for the selected period of time, the inner crown die 40 and support 42 and annular inner brim die 30 are raised. The molded hat body 15 is removed and has an appearance as illustrated in FIG. 2. That portion of the fabric which is maintained between flat surfaces 33 and 21 appears as the annular strip designated as element 19 in FIG. 2 while the fabric maintained between curved elements 22 and 32 during the molding operation appears as the brim 16 of the hat body. After the hat body is cooled, the crown 17 of the hat may be subjected to any desired forming operation such as can be obtained in the standard heated hat blocks. The edge of the brim 18 may then be trimmed with any suitable cutting tool, and the hat can be finished by any of the usual procedures known in the art.

The following examples illustrate the manner in which the invention may be practiced.

EXAMPLE 1

An all wool woven fabric which is 46.7 mils in thickness and weighs 7.46 ounces per square yard is treated with an emulsion containing 60% of polyvinyl chloride (available under the tradename "Geon 576" from the B. F. Goodrich Co.) resulting in a pickup of 12% of the polyvinyl chloride based on the weight of the fabric. A composite fabric is prepared by bonding two layers of the treated wool fabric to a woven monofilament polyester fabric (plain weave having 32 ends and 30 picks per inch; the polyester being a condensation polymer obtained from ethylene glycol and dimethyl terephthalate available under the tradename "Dacron" from E. I. du Pont de Nemours & Co.), by spraying the polyester fabric with a urethane adhesive in a toluene solution. Sufficient pressure is applied to ensure complete contact, and the adhesive is dried.

The composite fabric is cut into squares approximately 22 inches square and padded with solution of Example B to obtain a 70% wet pickup and dried at 65° C.

The composite fabric is placed in position on the molding apparatus described in FIGS. 3–5. In this experiment, the temperature of the inner crown die 40 and the outer crown and brim mold 20 is maintained at about 150° C. The apparatus is operated as described previously and the inner crown die 40 is maintained in its lowered position as shown in FIG. 5 for a period of 4 minutes whereupon the inner crown die 40 and the annular brim die 30 are raised, and the molded hat body is removed from cavity 23 and allowed to cool. The hat body is then placed in a common hat blocking device for 3 minutes at 150° C. to block the crown of the hat. The hat obtained in this manner is free of wrinkles and exhibits excellent shape retention properties. For example, it is possible to manually deform the hat by pressing down on the crown or by twisting the hat body itself, and upon releasing the pressure or twisting force, the molded hat immediately returns to its original desired shape.

The ability of the molded hats prepared in accordance with the process of this invention to resist wetting is demonstrated by subjecting the hat to a modification of the standard Water Repellency: Spray Test designated as AATCC 22–1964 (ASTM designated: B 583–63). The modification in the standard tests involves the substitution of the molded hat blank or hat for the fabric sample and metal embroidery hoop suggested in the test procedure; other conditions of the test are followed. This test measures the resistance of fabrics to wetting by water by observing the wetted pattern produced when water is sprayed against the crown of the hat. The size of the wetted pattern depends on the relative repellency of the fabric. The repellency of the fabric is evaluated by comparing the wetted pattern with a set of standards. A rating of 0 indicates complete wetting of the whole of the upper and lower surfaces, and a rating of 100 indicates no sticking or wetting of the upper or lower surfaces. Intermediate ratings indicate various degrees of sticking or wetting of the wet surface. The molded hat prepared in this example has a spray rating of 90.

EXAMPLE 2

The procedure of Example 1 is repeated except that the composite fabric is contacted with the solution of Example C. The hat obtained in this manner exhibits excellent shape retention properties and a spray rating of 90.

EXAMPLE 3

A molded hat prepared in accordance with the procedure of Example 1 except that the solution of Example D is used in lieu of the solution of Example B is found to have excellent shape retention properties and a spray rating when subjected to the modified Water Repellency: Spray Test described previously of 100.

EXAMPLE 4

The all wool fabric of Example 1 is felted by washing five times at about 70° C. with a commercial detergent and dried. The felted fabric is padded with the solution of Example D to a 70% wet pickup and dried at 65° C. A composite fabric is prepared by bonding two layers of the felted wool fabric to the woven polyester fabric described in Example 1 by spraying the polyester fabric with Urethane Adhesive 200 dissolved in methylene chloride and apply sufficient pressure to insure contact while drying the adhesive. Twenty-two inch squares of the composite fabric were placed in position on the molded apparatus illustrated in FIGS. 3–5, and the procedure described in Example 1 is followed except that the inner crown die 40 is maintained in its lowered position as shown in FIG. 5 for a period of two minutes and 20 seconds. The molded hat prepared by this procedure is found to have a spray rating of 95.

EXAMPLE 5

The procedure of Example 4 is repeated on a felted fabric except that the Urethane Adhesive is replaced by a natural rubber adhesive comprising 83% natural rubber and 17% of a thickener. This adhesive is applied to the polyester fabric with a paint roller. The felted hat obtained in this manner has a spray rating of 100.

EXAMPLE 6

The all wool woven fabric described in Example 1 is padded with the solution of Example A to a 70% wet pickup and dried at a temperature of from about 65–75° C. A composite fabric is obtained by bonding two layers of the treated wool fabric to the woven monofilament polyester fabric described in Example 1 using a natural rubber adhesive.

After drying, the composite fabric is cut into squares approximately 20 inches square, placed in position in the molding apparatus and converted to a hat body.

EXAMPLE 7

The procedure of Example 6 is repeated except that a cotton fabric is used as one layer of the composite fabric.

EXAMPLE 8

The procedure of Example 6 is repeated except that the natural rubber is replaced by neoprene.

EXAMPLE 9

The procedure of Example 6 is repeated except that the all wool woven fabric is replaced with a knitted fabric comprised of 65% polyhexamethylene adipamide and 35% wool.

EXAMPLE 10

The procedure of Example 1 is repeated except that the polyester is replaced by a polyurethane sheet which is one mil in thickness.

EXAMPLE 11

The procedure of Example 1 is repeated except that the polyester fabric is replaced by a polyamide fabric obtained by knitting filament yarn composed of 500 denier polyhexamethylene adipamide.

EXAMPLE 12

The procedure of Example 6 is repeated except that the solution of Example 8 is replaced by the mixture of Example F.

As can be seen from the above description and examples, this invention provides a method for preparing shaped articles and particularly hats and brassiere cups having unusual shape retention qualities. These articles are further characterized by improved shape definition and resistance to stress release and puckering. For example, the hats and brassiere cups obtained from this invention which are deformed either by crushing or twisting, wet with water or dry-cleaned by conventional methods, return to and maintain their molded shape without the necessity of subsequent refinishing. Furthermore, since the shaped articles are prepared under conditions which do not adversely affect the nature and characteristics of the textile fabrics utilized in the preparation of the composites, novel and unusual effects can be produced by the selection of particular patterns of woven and knitted fabrics.

What is claimed is:
1. A process for preparing molded articles of wearing apparel having enhanced shape retention and recoverability properties comprising
    (a) preparing a composite fabric comprising
        (i) at least one layer of a fixed structure of a synthetic thermoplastic composition,
        (ii) at least one layer of a textile fabric containing keratin fibers, and
        (iii) an adhesive composition between the thermoplastic and textile fabric layers to bond said layers together;
    (b) contacting the textile fabric with a reducing agent and an aldehyde-generating compound,
    (c) molding the composite to the desired shape at an elevated temperature and pressure whereby the aldehyde is activated and reacts with the reduced wool.
2. The process of claim 1 wherein the aldehyde-generating compound is a formaldehyde-generating compound.
3. The process of claim 1 wherein the reducing agent and aldehyde-generating compound are in solution.
4. The process of claim 3 wherein the solution is an aqueous solution also containing a swelling agent and a polyhydroxy compound.
5. The process of claim 4 wherein the polyhydroxy compound is ethylene glycol.
6. The process of claim 3 wherein the solution contains a fluorochemical water repellent.
7. The process of claim 3 wherein the solution is an aqueous solution containing from about 1 to about 19% by weight of a reducing agent, from about 0 to about 20% by weight of a polyhydroxy compound and from about 0.5 to about 20% by weight of an aldehyde generating compound.
8. The process of claim 1 wherein the reducing agent is sodium bisulfite.
9. The process of claim 1 wherein the aldehyde-generating compound is N-methylol acetamide.
10. The process of claim 1 wherein the textile fabric is contacted with a reducing agent and the aldehyde-generating compound prior to formation of the composite fabric.

References Cited
UNITED STATES PATENTS

| | | | |
|---|---|---|---|
| 2,508,713 | 5/1950 | Harris | 8—127.6 |
| 2,784,630 | 3/1957 | Koprow et al. | 156—72 X |
| 2,836,185 | 5/1958 | Hervey | 8—127.6 |
| 3,151,439 | 10/1964 | Dusenbury | 57—164 |
| 3,423,417 | 1/1969 | Sheehan | 8—127.6 |

OTHER REFERENCES

Dept. of Textile Industries, Letters to the Editor, J. B. Speakman et al. pp. T627, T628 July 1958.

SAMUEL W. ENGLE, Primary Examiner

U.S. Cl. X.R.

2—194; 8—127.6; 156—245; 161—89